United States Patent Office 3,551,057
Patented Dec. 29, 1970

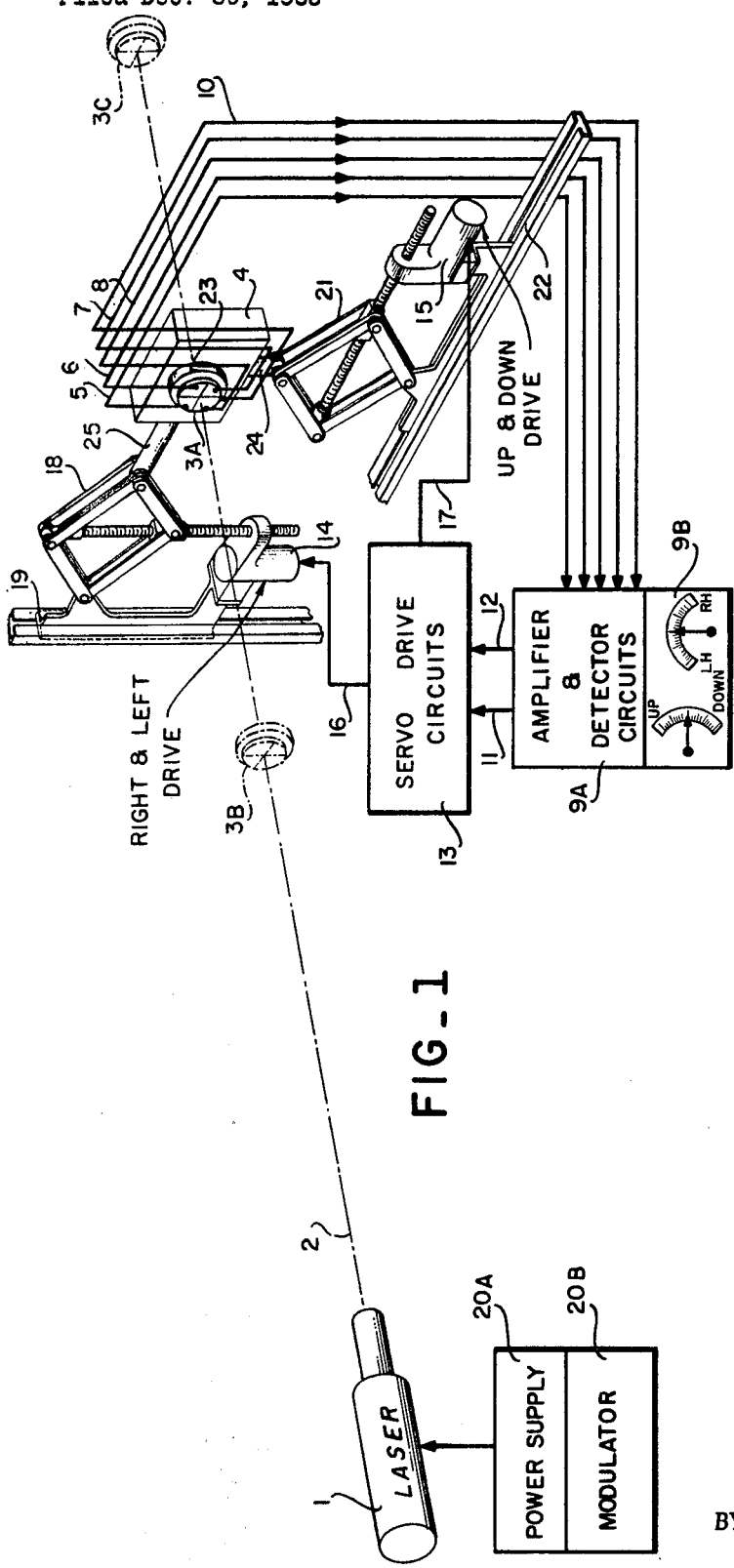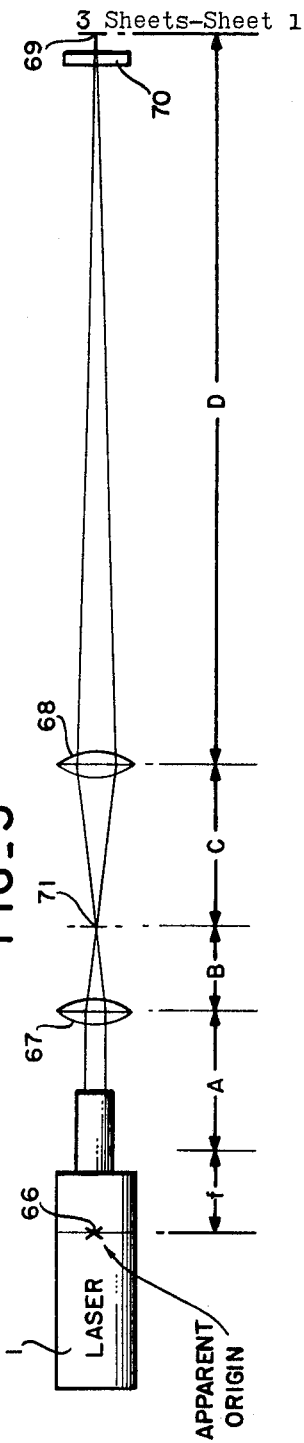

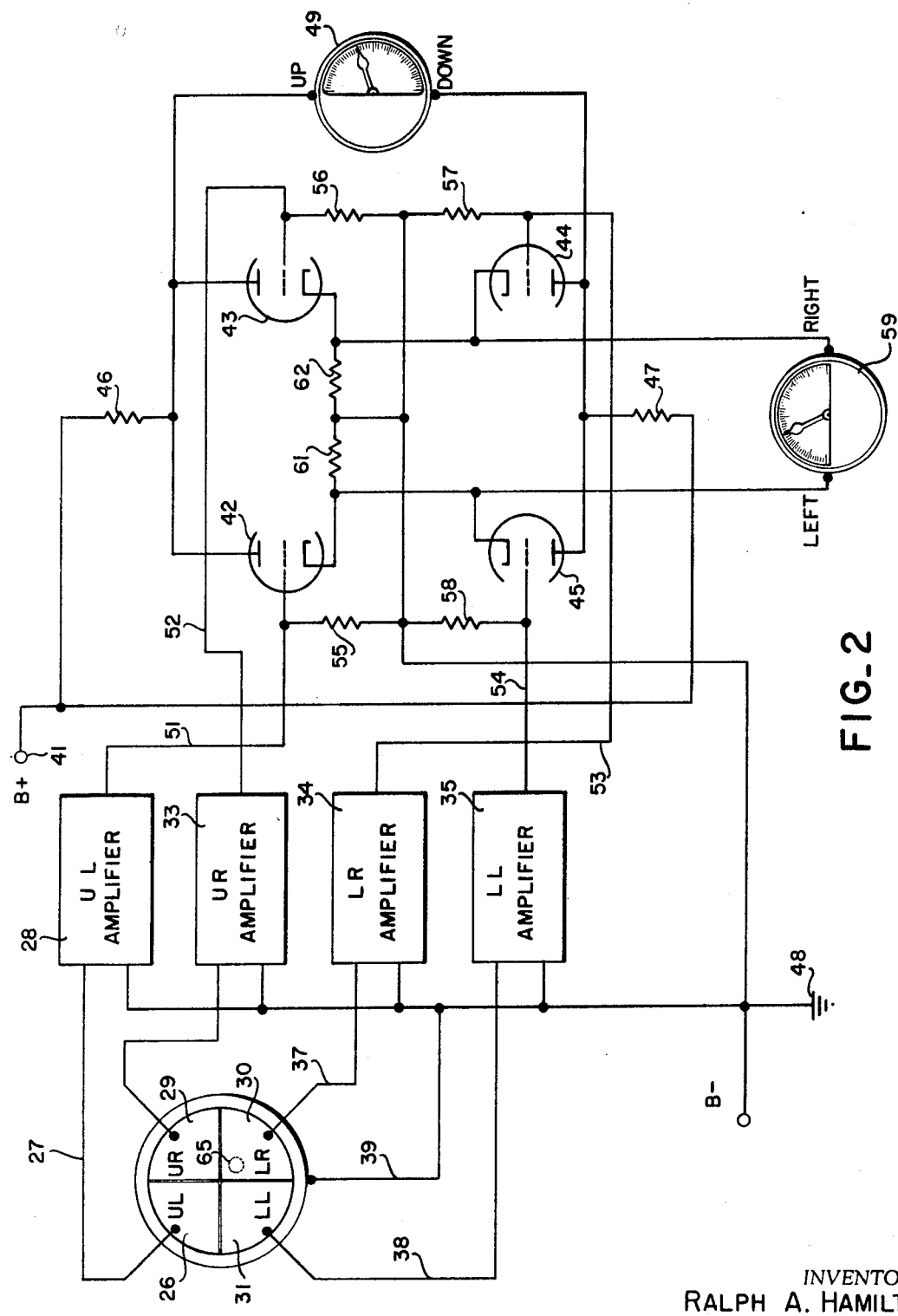
FIG._2

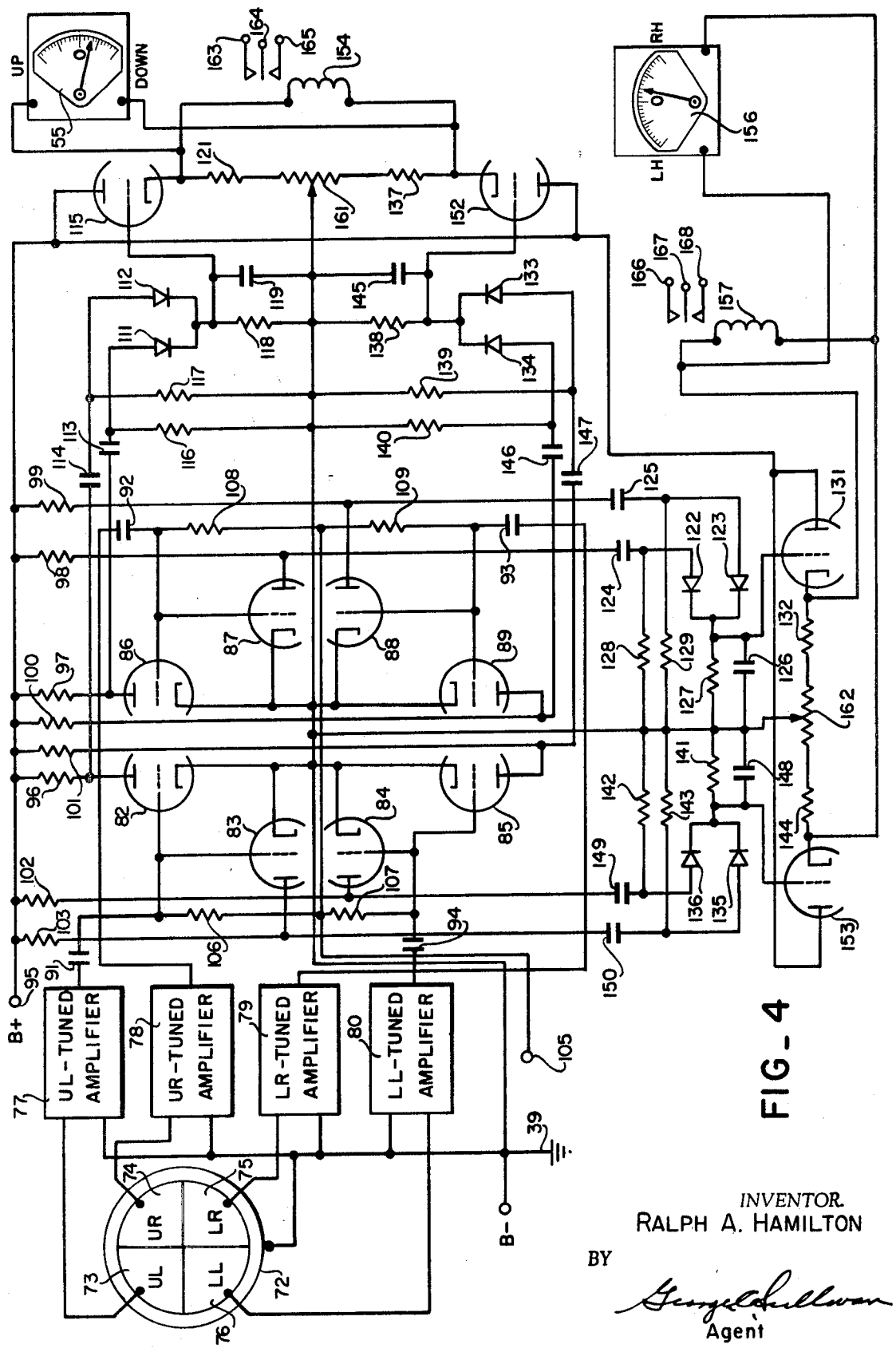

3,551,057
LASER BEAM ALIGNMENT APPARATUS
Ralph A. Hamilton, Glendale, Calif., assignor to Lockheed Aircraft Corporation, Burbank, Calif.
Filed Dec. 30, 1965, Ser. No. 517,644
Int. Cl. G01b *11/26;* G01c *1/00*
U.S. Cl. 356—172
18 Claims

ABSTRACT OF THE DISCLOSURE

Apparatus is described for aligning large structures, such as aircraft tooling jigs and the like, with respect to a basic reference line. The reference line is established by a laser beam which is projected onto a multielement light-sensitive target secured to the structure, and which is moveable therewith. Servomotors, controlled in two coordinate axes, bring the target and the attached structure into alignment with the laser beam.

BACKGROUND OF THE INVENTION

Prior to the present invention optical tooling has been commonly used to achieve accurate positioning of jig details, aircraft parts, or parts of any large precision structure. Such optical tooling involves sighting through powerful telescopes to determine the alignment of the parts. However, the advancements in missile and aircraft assembly require increasing accuracy and more particularly accuracies beyond the capabilities of present optical tooling methods. In an attempt to meet these requirements, it has been proposed heretofore to produce a very narrow beam of ordinary light which could be used for alignment purposes. Photoelectric sensing was to have been used to sense this beam. This technique was satisfactory only for short distances since the natural geometric enlargement of an ordinary light beam did not allow a small spot to be produced at great distances with sufficient intensity to activate the photoelectric sensor. The novel apparatus of the present invention, employing a laser light source and photoelectric elements responsive thereto, overcomes these shortcomings of prior methods and apparatus and provides an extremely accurate alignment means having capabilities not heretofore achievable. That is, apart from the improved accuracies obtainable, the present invention provides a substantial reduction in the time required to perform the desired alignment.

SUMMARY OF THE INVENTION

A laser is capable of generating an inherently coherent light beam. The beam may be sharply focused or collimated with an appropriate lens system so that the cross-sectional diameter is small and consists of almost parallel rays. This small beam of light is projected from the laser source at a first position to a photoelectric target, preferably divided into four quadrants, at a second position which constitutes the basic alignment reference. The reference target or additional targets also may be used at any intermediate position to determine alignment of a jig fixture of other structural part along the reference line established by the light beam.

In a typical construction the photoelectric target has a circular periphery and is divided into four quadrant sectors. Each quadrant sector comprises a photoelectric element of precisely the same area. The output of each photoelectric element is supplied to a corresponding one of four amplifiers which in turn energizes a bridge circuit. The output of the bridge circuit operates a meter or other indicator. When the laser beam is exactly centered on the common center of the photoelectric target sectors the output of the bridge will null. Any displacement of the beam from the center of the photoelectric target will result in a corresponding meter indication in the lateral and vertical directions. The beam may be modulated in which case the bridge amplifiers are tuned to the modulation frequency to eliminate the effects of ambient and stray light on the alignment signal. Narrow-spectrum light filters also may be used to enhance the signal-to-noise ratio of the system. That is, the light output from the laser is confined to a very narrow bandwidth and by employing an optical filter in front of the photoelectric target, having a light passband corresponding to the beam's bandwidth, the effects of spurious or ambient light outside the passband are eliminated.

If desired, the output signals may be used to drive servo valves (or other servo mechanisms) to control or actuate a prime mover to cause the target, and the structure to which it is attached, to be shifted in a direction which will center it on the beam so that all four quadrant photoelectric elements are sensing equal areas of the incident light beam.

In a preferred construction the wavelength of the laser beam is selected to be in the visible portion of the spectrum. This will provide a convenient visual reference which can be used for making an initial or approximate alignment of an object with respect to the reference line. That is, the laser will project a bright spot of visible light on any object intercepting the beam. Thus, the toolmaker or operator is provided with a ready visual reference for positioning the object at any desired location throughout the length of the laser beam to an approximate degree of accuracy.

The laser beam is subject to the same refraction deviations as is ordinary (noncoherent) light and may (over long distances) shift its position slightly due to air turbulence or thermal effects. However, photoelectric sensing of the laser beam provides a means, as will be described hereinafter, whereby the mean target position may be obtained. Measurements of this mean position thus obtained are far more reliable and more accurate than are those obtainable by human judgment.

In summary, this invention obviates the difficulties and shortcomings of prior optical alignment systems employing transits and levels since normal light beams are difficult to focus or collimate over a long path. It further enhances the use of automatic and precision alignment of the structures, tooling jigs, and supporting members, since they may be oriented to any position with reference to the established laser beam.

Also, there is provided by the present invention means for the automatic alignment of tooling fixtures, jigs, etc., of heavy or light industrial construction, over and along large distances. Furthermore, automatic positioning as provided by the present invention can reduce construction time by as much as 50% in many types of construction. The use of an intense laser beam and sensitive photoelectric elements extends the useful range of reference lines substantially beyond that afforded by prior optical techniques. For example, by the use of an infrared laser beam reference lines may be established for bridge construction so that work may be continued during foggy weather conditions.

It is therefore an object of the invention to provide novel and improved apparatus for alignment of structures with reference to a given line.

Another object of the invention is to provide novel and improved alignment apparatus employing a laser beam and a photoelectric target responsive thereto.

It is another object of the invention to provide novel and improved alignment apparatus which does not require adjustment of the reference laser beam by focusing at intermediate points.

Yet another object of the invention is to provide novel and improved alignment apparatus which will permit substantial savings in time in the construction of precise assemblies.

It is still another object of the invention to provide novel and improved alignment apparatus having a sensor target which permits automatic and precise relative alignment of parts and a reference line, with accuracies exceeding that obtainable with prior optical techniques such as surveyor's transits, sight levels, and alignment telescopes.

It is yet another object of the invention to provide a novel and improved alignment apparatus which is quickly set up and easily maintained.

Still another object of the invention is to provide a novel closed-loop servo system for maintaining the alignment of a given structural assembly, in response to alignment errors sensed by the novel sensing apparatus of the invention.

Still another object of the invention is to provide novel and improved optical alignment apparatus which overcomes disadvantages of prior devices employed heretofore to achieve generally similar purposes.

These and other features and objects of the invention will become more apparent from the following specification and drawings.

BRIEF DESCRIPTION OF THE DRAWINGS

FIG. 1 is a composite diagram of one embodiment of the apparatus showing the laser light source and target elements in simplified perspective form and the signal processing elements in block diagram form;

FIG. 2 is a schematic circuit diagram of the target and meter bridge circuit;

FIG. 3 diagrammatically illustrates an optical system useful for reducing the laser beam spot size at great distances; and FIG. 4 is a schematic circuit diagram of a servo amplifier control system for controlling a positioning mechanism in response to error signals generated by the photoelectric target.

DESCRIPTION OF THE PREFERRED EMBODIMENT

Looking now at FIG. 1 there is shown a simplified diagram of apparatus suitable for carrying out the method of the invention. The narrow beam laser 1 projects a narrow beam of light 2 through the area of alignment and strikes the photoelectric target 3A. The line of light between 1 and 3A constitutes the basic alignment reference line.

After the initial alignment of laser beam 2 with respect to the target 3A, an object to be located with respect to the reference line may be placed in the area of alignment and positioned at any intermediate position along beam 2 to determine alignment of parts for which alignment is desired. The part to be aligned is indicated at 4 and is provided with a photoelectric target 3B which is identical in construction with target 3A. Laser 1 is energized by power supply 20A and modulation of beam 2 may be provided by means of modulator 20B, if desired.

The target position identifications 3B and 3C illustrates intermediate positions to which part 4 may be moved to bring it into correct location with respect to the laser beam 2. Lines 5, 6, 7, and 8 are electrical conductors providing transfer of the signals produced by target 3A-3C to the amplifier and detector circuits 9A. A common signal return line 10 is also provided. The light responsive target 3A is divided into four quadrants, each of which is coupled to the detector circuits 9A by a corresponding one of lines 5-8. Indicating meters 9B are responsive to amplifier and detector circuits 9A to indicate the magnitude and direction of target displacement with respect to beam 2. Both the horizontal indicating meter and the vertical indicating meter will indicate zero when the target 3A-3C is exactly centered on beam 2. The outputs of detector circuits 9A also comprise right and left drive signals on line 11 and, up and down drive signals on line 12. The signals on lines 11 and 12 control the servo drive circuits 13, which in turn activate servomotors 14 and 15, via lines 16 and 17, respectively. A motor-drive jack mechanism 18 is secured to part 4 and serves to horizontally displace part 4 in response to energization of servomotor 14. Jack mechanism 18 is slidably supported in ways 19 which allows it to be vertically displaced along the axis controlled by servomotor 15.

Jack mechanism 21 is slidably supported by ways 22 and upon energization of servomotor 15, will cause part 4 to be vertically displaced. Mechanisms 18 and 21 are illustrative only, since any suitable positioning device could be used to move part 4 and target 3B in response to the outputs of servo drive circuits 13. For example, there is shown in my co-pending application Ser. No. 356,182, filed Mar. 31, 1964, entitled, Hydraulic Positioner, now Pat. No. 3,291,321 apparatus for hydraulically orienting structures. The apparatus disclosed therein comprises a base upon which is mounted a carriage, the carriage being retained and adapted to be universally positioned by hydraulic cylinder means. Servo controlled means are provided whereby structures secured to the carriage may be moved in any or all of the six basic degrees of freedom. Input to the control means may be in the form of electrical signals which control the hydraulic cylinder means. This hydraulic positioner apparatus may be employed in the present invention in lieu of the servomotor controlled jack mechanisms 18 and 21 shown in FIG. 1.

It should be understood that the target 3A may be fixed to the structure or part 4 by any suitable mounting means, indicated generally at 23. In the interest of clarity, the part to be moved (4) is shown in FIG. 1 as a plate but it should be understood that this may comprise any desired structure such as a tool detail, a jig fixture, or other member which is to be aligned with respect to a given reference line.

As can be seen, part 4 is movably supported by means of jack mechanisms 18 and 21 which permit part 4 to be freely moved along two degrees of freedom. More particularly, the part 4 is vertically supported on mounting member 24 which is secured to jack mechanism 21. Servomotor 15 is in driving engagement with a leadscrew which will cause jack mechanism 21 to move member 24 up and down depending upon the direction of rotation of the bidirectional servomotor 15.

Similarly, a horizontal motion may be imparted to part 4 by means of jack mechanism 18. Jack mechanism 18 is coupled to part 4 via mounting member 25. Bidirectional servomotor 14 drives a leadscrew to cause the jack mechanism 18 to impart the right or left horizontal motion to part 4. The servo drive circuit 13 may be of any suitable and well known construction. The error signals for operating the servo drive circuits 13 are derived from detector circuits 9A, the function of which will be described in greater detail in connection with FIG. 4.

Looking now at FIG. 2 there is shown the light responsive target and a simplified circuit diagram of an indicating circuit therefor. This embodiment only provides a meter indication of relative alignment of the part to be located and the reference line, as contrasted with the embodiment of FIG. 1 in which the part is automatically positioned. A consideration of the circuits of this simpler embodiment will be useful in understanding the somewhat more complex circuits to be described hereinafter. The upper left hand quadrant 26 is connected via line 27 to the upper-left amplifier 28. Similarly, the upper-right, lower-right, and lower-left quadrants 29–31 are coupled to upper-right amplifier 33, lower-right amplifier 34, and lower-left amplifier 35 respectively, via respective ones of lines 36–38. The target quadrants are referenced to ground via line 39. The inputs to amplifiers 28, and 33-35 are also referenced to ground. Amplifiers 28 and 33-35 comprise direct-coupled preamplifiers of any suitable and well-known construction and serve to amplify the output of the light-responsive target quadrants 26, 29-31 to a suitable level for operation of the amplifier bridge circuit now to be described. In this embodiment the laser beam is unmodulated and amplifiers 28, 33-35 are D-C amplifiers.

The bridge amplifier accepts the four output signals from preamplifiers 28, 33-35 and provides a pair of outputs, one of which indicates vertical displacement and the other of which indicates horizontal displacement of the target with respect to the beam impinging thereon.

A positive operating potential is supplied to terminal 41 and then to the plates of vacuum tubes 42 and 43 via plate resistor 46, and to vacuum tubes 44 and 45 via plate resistor 47. The outputs of amplifiers 28, 33-35 are supplied to the grids of tubes 42-45, respectively, via corresponding ones of lines 51-54. The grides of tubes 42-45 are referenced to ground 48 via input resistors 55-58, respectively. The output signals from tubes 42-45 appear across cathode resistors 61 and 62. Also, the outputs of these tubes is available at their plates, as will appear hereinafter.

Meter 49 is connected between the common connection to the plates of tubes 42 and 43, and the common connection between the plates of tubes 44 and 45. Meter 59 is connected between the common connection to the cathodes of tubes 42 and 45, and the common connection between the cathodes of tubes 43 and 44.

There follows a description of the functioning of this circuit. Light from the laser impinges on the photoelectric target in the lower-right quadrant 30 as indicated by the laser beam spot 65. This produces a signal via amplifier 34 which applies a positive voltage across resistor 57 of tube 44.

Resistors 61 and 62 in the cathod circuits of the four tubes 42-45, provide a bridge circuit for actuation of the motor 59. The resistors 46 and 47 in the plate circuits provide a bridge circuit for actuation of the meter 49. Meter 59 indicates lateral position of the target with respect to the beam and meter 49 indicates the vertical relationship of the target with respect to the laser beam.

As the voltage on the grid of tube 44 becomes more positive, tube 44 conducts heavily.

As tube 44 conducts more heavily than the other three tubes 42-43 and 45, the common cathodes of tubes 43 and 44 becomes more positive in voltage than the common cathodes of tubes 42 and 45 causing the pointer of meter 59 to swing to the left as shown in FIG. 2. This indicates that the target centerline is to the left of the laser beam center.

At the same time the common plates of tubes 44 and 45 become less positive (because of the conduction of tube 44) than the common plates of tubes 42 and 43. This energizes meter 49 causing its pointer to move upward, as indicated in FIG. 2. The two meters 49 and 59 then indicate that the target is to the left and above the laser beam spot 65. The electrical information supplied to meters 49 and 59 can be used, as inputs to any servo system of suitable and well-known construction, which may, for example, employ relay bridges, or any other type of standard automated control system, which in turn actuates a prime mover to cause the fixture being located to move the target into such a position that the outputs from all four quadrants of the target are equal.

When the current in all four tubes (42-45) are equal, the bridge will be balanced and a zero or null position will have been attained.

It is preferred that the beam be modulated at a given frequency, which for example may be 2400 c.p.s., and amplifiers 28, 33-35 be tuned to this modulation frequency so that ambient and stray light will have no effect on the alignment control signals.

In a typical construction the laser source may comprise a modulated Spectra-Physics, Model 115 He-Ne laser radiating at 6,238 angstroms, providing a continuous-wave output of under 1 milliwatt. It has been found that the light emitted from a conventional continuous-wave gas laser is not completely coherent, collimated or of a single frequency, as is sometimes believed. That is, it cannot be focused to an infinitely small spot nor can it be collimated into a narrow beam that neither converges nor diverges. Although laser-generated light can be several orders of magnitude better in these respects than ordinary light, there are limits to which it can be applied and it must be suitably employed to obtain optimum results. In a preferred embodiment of the invention the beam is controlled by simple lenses to provide a beam of the desired characteristics over distances of several hundred feet. Beam size at the target is important since the sensitivity of readout from the target is ordinarily proportional to beam diameter.

At large distances, the laser method is far more accurate than the best optical methods available. To add to this accuracy advantage, the laser method uses photoelectric reception of the laser beam and thus provides a means of readout that can be applied to control various types of positioning equipment as described hereinabove to provide automatic precise alignment of structural parts. In a typical construction, the desired accuracy of alignment may be maintained over several hundred feet to an accuracy of ±0.005 inch rather than approximately 50 feet as in the case of the best optical equipment of the prior art. Repeatability of ±0.005 inch at a distance of 136 inches has also been demonstrated. This figure contains all errors incurred when automatically controlling the hydraulic positioner.

Without a collimating lens system, the beam of the particular laser mentioned hereinabove, operating in a hemispherical mode, diverged to a diameter of approximately one inch at a distance of 15 feet. This corresponds to an included angle of 19 minutes and 52 seconds. By means of the lens system shown in FIG. 3, the beam size may be maintained within desired limits over substantially greater distance. Laser 1 is provided with an internal spherical reflector which acts as a negative lens. A laser of this construction is shown in Pat. No. 3,159,-707. The apparent emanating point of the light is indicated at 66. First lens 67 comprises a simple double-convex lens spaced from the exit aperture of laser 1 by a distance "A." Second lens 68 is spaced from first lens 67 by a distance "B+C," and the source (66) image is focused at a second image plane 69 at a distance "D" from lens 68. The first image plane is indicated at 71. The formula for object-to-lens (P) and lens-to-image plane (Q) and focal length (f) is as follows:

$$\frac{1}{P}+\frac{1}{Q}=\frac{1}{f} \text{ then } \frac{1}{P}=\frac{1}{f}-\frac{1}{Q} \quad (1)$$

In a typical construction, lens 67 may have a focal length of 1.75 inches, lens 68 may have a focal length of 6.89 inches. The distance A=15⅜₁₆ inches, B=2¼ inches, C=6¹⁵⁄₁₆ inches, and D=804 inches (or 67 feet). The spot size at second image plane 69 will then be ⅛ inch in diameter. Equation 1 does not consider diffraction limiting.

If desired, a monochromatic optical filter 70 may be placed over the photoelectric target elements in order to block all ambient light except that having the dominant wavelength of the laser beam. Also, as indicated previously, the laser beam may be modulated by means of a modulator 20B of any suitable and well-known construction. The detecting apparatus is then made sensitive only to light which is modulated at the selected frequency so that the apparatus will be immune to the effects of extraneous and/or ambient light. Either a selective light filter or beam modulation, or both may be employed. The beam modulation feature is employed in the embodiment of FIG. 4, which also incorporates means for controlling a servo positioning system. The circuit of this embodiment employs a vacuum tube separator circuit and combining diode rectifying circuits in lieu of the amplifier-bridge circuit of FIG. 2. The circuit of FIG. 4 is preferred over that of FIG. 2 since it is immune to extraneous light and it provides a more linear output.

Looking now at FIG. 4, the target 72 comprises quadrant sectors 73–76, each of which is connected to a corresponding one of tuned amplifiers 77–80. Amplifiers 77–80 are each tuned to pass a signal having a frequency corresponding to the frequency of the light beam modulation. The target sectors 73–76 are referenced to ground 39 as are the inputs of amplifiers 77–80. The output from amplifier 77 is supplied to the grids of vacuum tubes 82 and 83 via coupling capacitor 91. The output of amplifier 78 is supplied to the grids of tubes 86 and 87 via capacitor 92. Similarly, the output of amplifier 79 is supplied to the grids of tubes 88 and 89 via capacitor 93. The output of the remaining amplifier 80 is supplied to the grids of tubes 84 and 85 via capacitor 94. Plate voltage is provided to tubes 82–89 from positive power supply terminal 95 via plate resistors 96–103, respectively. Negative grid bias is supplied to tubes 82–83 from terminal 105 via fixed resistor 106. Bias is supplied to tubes 84 and 85 via fixed resistor 107. Bias is supplied to tubes 86 and 87 from terminal 105 via resistance 108. Similarly, the negative bias to tubes 88 and 89 is supplied by means of resistance 109.

The output signals appearing at the plates of tubes 82 and 86 are rectified via diodes 111 and 112 which have their cathodes connected in common. Coupling capacitors 113 and 114 connect diodes 111 and 112 to tubes 86 and 82 respectively. The combined direct current signal output from diodes 111 and 112 is supplied to the grid of tube 115. The voltage appearing across grid return resistor 118 and filter capacitor 119 is determined by the rectified voltage produced by the signal of greatest amplitude from tube 82 or 86, or both. Resistors 116 and 117 and A-C signal load resistors from capacitors 113 and 114, respectively, to ground. The output of tube 115 appears across cathode resistor 121 and a portion of balancing potentiometer 161.

The outputs of tubes 87 and 88 are similarly combined via the circuit comprising diodes 122 and 123, and capacitors 124 and 125. These capacitors (124 and 125) are loaded by resistors 128 and 129, and the combined output appears across grid return resistor 127. The signal across resistor 127 and capacitor 126 is supplied to the grid of tube 131. The output of tube 131 appears across cathode resistor 132 and a portion of balancing potentiometer 162.

Identical circuits combine the outputs from the pairs of tubes comprising tubes 85 and 89, and 83–84; these circuits comprise diodes 133–136, resistors 137–144, and capacitors 145–150. The outputs of tubes 85 and 89 are combined and drive tube 152; the outputs of tubes 83 and 84 are combined and drive tube 153.

Amplifier tubes 115 and 152 operate as relay drivers and have their outputs impressed across relay coil 154. Relay coil 154 is the operating coil of a polarized relay having a center neutral position when the coil is de-energized. The polarity of the driving voltage will determine which of a plurality of contacts 163–165 will be closed. Similarly, relay coil 157 is a polarized relay coil having contacts 166–168 and is energized by the outputs of relay driver tubes 131 and 153. Relay contacts 163–168 are used for controlling the servomotors of the positioning system, as will appear hereinafter. Zero-center meters 155 and 156 are connected across relay coils 154 and 157, respectively, and serve to indicate the magnitude and direction of the target's (72) displacement relative to the laser beam.

The four conditions which can exist between the target 72 and the laser beam are as follows:

(1) Beam not falling on any of the photosensitive quadrants 74–76;
(2) Beam falling on only one quadrant;
(3) Beam falling on the line between two quadrants; or,
(4) Beam falling centered with equal illumination on each one of all four quadrants.

The functioning of the circuit of FIG. 4 under each of these conditions is as follows:

Condition 1.—Laser beam not falling on any of the photosensitive quadrants. No signals will be received; all relay tube grids (115, 152, 131, 153) will be at zero bias; the plates of tubes 82–89 will be balanced, and relay coils 154 and 157 will not be energized. Under this condition of static balance, all circuits are balanced so that relay contacts 164 and 167 are in their center-off positions, and meters 155 and 156 which each indicate zero.

Condition 2.—Beam falling on only one quadrant of the photocell target. In this condition assume that the beam is falling on the upper-left quadrant 73. An A-C signal from tuned amplifier 77 will be passed by capacitor 91, amplifier by tubes 82 and 83, and provide signals to diodes 112 and 135. The signals from diode 112 will energize tube 115 and cause an unbalance of the relay drive tubes 115 and 152 which will in turn close relay contact 164 to contact 163 which will represent a command to the positioning equipment to cause upward movement of the target and the part of fixture to which it is related. At this same time, the signal from diode 135 will energize tube 153 and cause an unbalance of the relay drive tubes 153 and 131 which will in turn close contact 167 to contact 166 corresponding to a command to the positioning equipment to move to the left. The target 72 will be moved in the two appropriate directions whose vector direction is diagonally toward the quadrant on which the beam is falling. The pointer of meter 155 will deflect downwardly (as shown in FIG. 4) to indicate that target 72 is below the laser beam. The pointer of meter 156 will move to the right (as shown in FIG. 4) to indicate that target 72 is to the right of the laser beam.

Condition 3.—Assume that the beam is falling on the line between two quadrants. For example, assume the laser beam is falling above the target 72 horizontal centerline, but directly on the vertical centerline so as to equally illuminate quadrant sectors 73 and 74. This will result in tuned amplifiers 77 and 78 receiving signals and these signals will be amplified by tubes 82, 83, 86, and 87. The outputs of these tubes will be supplied to their respective mixing diodes 112, 135, 111, and 122. As a consequence, the combined signals via diodes 111 and 112 will cause tube 115 to conduct and thereby energize relay coil 154. This will result in an upward drive of the positioning mechanism. However, the signals supplied via diodes 122 and 135 will cause equal and opposite signals to be applied to coil 157 through tubes 153 and 131. Inasmuch as relay contact 167 remains in a balanced or neutral condition, neither right- nor left-hand drive motion will result. As a consequence, the positioning mechanism will continue moving the target directly upward until the beam falls on the center of the target. Prior to the automatic repositioning of the target, meter 155 will indicate that the target 72 is below the laser beam, and meter 156 will read zero to indicate that the target is properly oriented with respect to the beam in the right and left directions.

Condition 4.—In this condition the laser beam is centered with equal illumination on each of the four quadrant sectors 73–76. This will result in signals being amplified by all four tuned amplifiers 77–80, as well as amplifiers 82–89, and driver tubes 115, 131, 152, and 153. However, since the relay coils 154 and 157 see no unbalance of output signals, no command signal will result and there will be no movement of the target. Also, meters 155 and 156 will each read zero. This is the zero centered or null position of balance and the target must be precisely centered with respect to the laser beam in order to attain this condition.

The circuit of FIG. 4 provides complete separation of the four input signals and eliminates cross-talk.

Current control adjustments to establish the desired null condition may be made by means of balancing potentiometers 161 and 162. These adjustments provide for static balance when no signal is being received. Dynamic balance may be provided by means of individual gain controls at each of the four tuned amplifiers 77–80. A slight smoothing of the control signals is provided by the R-C input networks to the relay driver tubes (i.e., 118–119). The relatively long time constant of this network permits the means position of the beam to be sensed, notwithstanding small shifts in the beam's position resulting from air turbulence or thermal disturbances, and thereby improves the accuracy and stability of the system.

It is desired that the photosensitive surface of the target sectors (73–76) be a flat plane since this will give exact zero positioning of the target even though the target is not exactly perpendicular to the axis of the laser beam. The photoelectric elements comprising the target need not be limited to four in number, nor need they be disposed in a quadrature pattern. That is, a larger number of elements may be employed and they may be radially disposed in any suitable pattern. Also, various optical means other than that described hereinabove may be employed to collimate or focus the projected laser light beam.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

I claim:

1. Electrooptical alignment apparatus for spatially aligning an object through two rectilinear degrees-of-freedom normal to the axis of a reference beam of radiant energy, comprising:
   laser means for projecting a fixed beam of radiant energy from a given reference location through an alignment area, the projected image of said beam being circular;
   an array of contiguous photoelectric target elements radially disposed from a common intersection, each individual element of which generates an electrical output signal having a magnitude corresponding to the area of said beam image impinging thereon, said array being secured to said object for rectilinear movement therewith; and
   indicator means responsive to said electrical output signals for providing orthogonal coordinate dimensions indicative of the relative spatial position of said object in said alignment area with respect to the axis of said beam.

2. Electrooptical alignment apparatus as defined in claim 1 including:
   circuit means connected to said array of target elements and responsive to said output signals to provide a plurality of control signals indicating the magnitude and direction of orthogonal deviation of said object from the axis of said beam.

3. Electrooptical alignment apparatus as defined in claim 1 including:
   means for rectilinearly translating said object through said alignment area.

4. Electrooptical alignment apparatus as defined in claim 1 wherein said array of target elements comprises:
   four coplanar quadrant sectors radially disposed about a common center.

5. Electrooptical alignment apparatus as defined in claim 4 wherein said indicator means includes:
   a bridge amplifier wherein each bridge arm is responsive to one of said quadrant sectors.

6. Electrooptical alignment apparatus as defined in claim 4 wherein the plane in which said coplanar quadrant sectors lie is normal to said beam axis, and including:
   rectilinear translation means responsive to said output signals from said array of target elements to coaxially align a normal extending through said common center of said quadrant sectors with the axis of said beam in said reference area whereby the projected circular image of said beam will be divided equally onto said quadrant sectors.

7. Electrooptical alignment apparatus comprising:
   laser means for projecting a beam of light along a given path, the projected image of said beam being circular;
   a movable array of cells selectively positionable through two rectilinear degrees-of-freedom with respect to the axis of said beam and responsive to interception of said beam to generate corresponding output signals each having a magnitude corresponding to the area of the portion of said beam impinging thereon, said array lying in a plane normal to said light path and contiguously disposed about a common center through which a normal to said plane extends;
   mounting means for securing said array to an object for rectilinear movement therewith and which is to be orthogonally aligned with respect to said given path;
   detector circuit means responsive to said output signals to generate corresponding control signals proportional to the magnitude of said output signals; and
   rectilinear translation means responsive to said control signals for orthogonally moving said mounting means and said object in directions which will bring said normal extending through said common center into coaxial alignment with the major axis of said given path.

8. Electrooptical alignment apparatus as defined in claim 7 including:
   servo drive means electrically coupled to the output of said detector circuit means and mechanically connected to said mounting means for repositioning said normal extending through said common center, and said mounting means, into coaxial alignment with the major axis of said beam in response to changes in magnitude of said control signals which correspond to coaxial misalignment between the center of said beam and the normal extending through said common center of said array of cells.

9. Electrooptical alignment apparatus as defined in claim 7 wherein said array of cells comprises:
   four contiguous quadrant sectors radially disposed about said common center.

10. Electrooptical alignment apparatus as defined in claim 7 including:
    lens means for focussing said beam of light at a distant point beyond said array.

11. Electrooptical alignment apparatus as defined in claim 7 including:
    means associated with said laser means for modulating the intensity of said beam at a given modulation frequency; and
    demodulator means connected between said cells and said detector circuit means, and responsive to said modulation frequency, to provide said output signals whereby said apparatus is made insensitive to ambient radiant energy.

12. Electrooptical alignment apparatus as defined in claim 7 including:
    a monochromatic filter interposed between said array of cells and said laser means, said filter being substantially transparent to the principal wavelength of the light from said laser means and substantially opaque to light of other wavelengths.

13. Electrooptical alignment apparatus as defined in claim 7 having:
    a plurality of servo drive circuits responsive to corresponding ones of said control signals to generate corresponding servo drive signals, and wherein said positioning means comprises:

servo positioning means responsive to said servo drive signals for rectilinearly translating the normal extending through said common center of said array of cells into coaxial alignment with the axis of said beam and thereby align said object with respect to said given path.

14. Electrooptical alignment apparatus as defined in claim 7 including:

indicator means responsive to said control signals to provide a plurality of orthogonal coordinate values indicative of the relative position of the axis of said beam with respect to the normal extending from said common center of said array.

15. Electrooptical alignment apparatus as defined in claim 2 including:

means for modulating the intensity of said beam of radiant energy at a given frequency; and selective frequency means associated with said circuit means for rendering said circuit means responsive to the output of said array of target elements only when activated by radiant energy which is modulated at said given frequency.

16. Electrooptical alignment apparatus comprising:

laser means for projecting a collimated beam of light along a given path, the projected image of said beam being circular;

a movable array of cells selectively positionable through two rectilinear degrees-of-freedom with respect to the axis of said beam and responsive to interception of said beam to generate corresponding output signals each having a magnitude corresponding to the area of the portion of said beam impinging thereon said array being substantially coplanar and contiguously disposed about a common center;

mounting means for securing said array to an object for rectilinear movement therewith and which is to be orthogonally aligned with respect to said given path;

indicator means responsive to said output signals for providing a plurality of orthogonal coordinate values indicative of the relative spatial position of said object with respect to the axis of said beam;

modulator means associated with said laser means for cyclically changing the intensity of said beam at a given modulation frequency; and demodulator means interposed between said cells and said indicator means, and responsive to said modulation frequency, to provide said output signals whereby said apparatus is made insensitive to ambient radiant energy.

17. Electrooptical alignment apparatus as defined in claim 15 including:

means for modulating the intensity of said beam of radiant energy at a given frequency; and selective frequency means associated with each of said amplifier means for rendering said amplifier means responsive to the output of said quadrant elements only when activated by radiant energy which is modulated at said given frequency.

18. Electrooptical alignment apparatus comprising:

laser means for projecting a circular collimated beam of light along a given path;

a movable array of cells selectively positionable through two rectilinear degrees-of-freedom with respect to the axis of said beam and responsive to interception of said beam to generate corresponding output signals each having a magnitude corresponding to the area of the portion of said beam impinging thereon said array being substantially coplanar and contiguously disposed about a common center;

mounting means for securing said array to an object for rectilinear movement therewith and which is to be orthogonally aligned with respect to said given path;

indicator means responsive to said output signals for providing a plurality of orthogonal coordinate values indicative of the relative spatial position of said object with respect to the axis of said beam;

modulator means associated with said laser means for cyclically changing the intensity of said beam at a given modulation frequency; and demodulator means interposed between said cells and said indicator means, and responsive to said modulation frequency, to provide said output signals whereby said apparatus is made insensitive to ambient radiant energy.

References Cited

UNITED STATES PATENTS

| | | | |
|---|---|---|---|
| 2,027,393 | 1/1936 | McCreary | 250—203UX |
| 2,070,178 | 2/1937 | Pottenger et al. | 250—203X |
| 2,403,387 | 7/1946 | McLennan | 250—203 |
| 2,952,779 | 9/1960 | Talley | 88—14(A)X |
| 2,965,763 | 12/1960 | Lemmerman | 250—203 |
| 3,029,348 | 4/1962 | Heinz | 250—210UX |
| 3,098,934 | 7/1963 | Wilson et al. | 250—210X |
| 3,207,904 | 9/1965 | Heinz | 88—14(A)X |
| 3,229,099 | 1/1966 | Schwinghamer | 88—14(A)X |
| 3,242,795 | 3/1966 | Hughes | 88—14(EG) |
| 3,316,800 | 5/1967 | Kibler | 88—14(A) |
| 2,952,779 | 9/1960 | Talley | 250—209 |
| 2,888,623 | 5/1959 | Atwood | 356—89 |

RONALD L. WIBERT, Primary Examiner

P. K. GODWIN, Assistant Examiner

U.S. Cl. X.R.

250—203, 209, 210; 356—152, 153